United States Patent
Nasu et al.

(10) Patent No.: US 7,950,028 B2
(45) Date of Patent: May 24, 2011

(54) DISK APPARATUS WITH IMPROVED OPTICAL PICKUP MOUNT

(75) Inventors: Kazumasa Nasu, Daito (JP); Ryuuji Hayashi, Daito (JP)

(73) Assignee: Funai Electric Co., Ltd. (JP)

( * ) Notice: Subject to any disclaimer, the term of this patent is extended or adjusted under 35 U.S.C. 154(b) by 888 days.

(21) Appl. No.: 11/892,945

(22) Filed: Aug. 28, 2007

(65) Prior Publication Data

US 2008/0077948 A1    Mar. 27, 2008

(30) Foreign Application Priority Data

Sep. 26, 2006   (JP) .................................. 2006-007803

(51) Int. Cl.
*G11B 7/00* (2006.01)
*G11B 17/028* (2006.01)

(52) U.S. Cl. .................... 720/690; 720/692; 720/706

(58) Field of Classification Search .......... 720/604–605, 720/689–695, 703, 706, 712–714; *G11B 17/03, G11B 17/056*
See application file for complete search history.

(56) References Cited

U.S. PATENT DOCUMENTS

| | | | |
|---|---|---|---|
| 6,704,266 B2 * | 3/2004 | Yanagiguchi | 720/635 |
| 2005/0262523 A1* | 11/2005 | Okazaki et al. | 720/604 |

FOREIGN PATENT DOCUMENTS

| | | |
|---|---|---|
| JP | 10-134501 | 5/1998 |
| JP | 11-003582 | 1/1999 |
| JP | 11-283304 | 10/1999 |
| JP | 2000-048539 | 2/2000 |
| JP | 2002-008345 | 1/2002 |
| JP | 2002-237119 | 8/2002 |
| JP | 2004-152383 | 5/2004 |
| JP | 2004-152388 | 5/2004 |
| JP | 2005-025885 | 1/2005 |
| JP | 2007172787 A * | 7/2007 |

OTHER PUBLICATIONS

Machine-Assisted Translation of JP 2007172787 A.*

* cited by examiner

*Primary Examiner* — Wayne R Young
*Assistant Examiner* — Nathan A Danielsen
(74) *Attorney, Agent, or Firm* — Bacon & Thomas, PLLC (57) ABSTRACT

The position of an optical pickup with respect to a disk is maintained accurately by preventing the free end portion of a cantilever movable member from being displaced lower than its proper position during the rotation of the disk even if the movable member is heavy to have improved vibration characteristics. There are provided a movable member 4, a chassis 1, a clamp mechanism 3, and a cam mechanism 5. The cam mechanism 5 includes a shift lever 51 connected to the free end portion of the movable member 4 via elastic bodies 42 and a cam main body 55. Positioning means 8 is composed of a protrusion 53 on the shift lever 51, a stepped engaging surface 15 for supporting the protrusion 53 thereon, and a guide mechanism 71. There is also provided anti-positioning means 9 for disengaging the protrusion 53 from the engaging surface 15.

3 Claims, 8 Drawing Sheets

DISK APPARATUS WITH IMPROVED OPTICAL PICKUP MOUNT

BACKGROUND OF THE INVENTION

1. Field of the Invention

The present invention relates to disk apparatuses and, in particular, to a disk apparatus that takes measures to prevent the degradation in the accuracy of the operation of optically processing a rotating disk surface using an optical pickup due to the vibration and therefore the change in the posture of a traverse as a movable member on which the optical pickup is mounted.

2. Description of the Related Art

Figure 7:
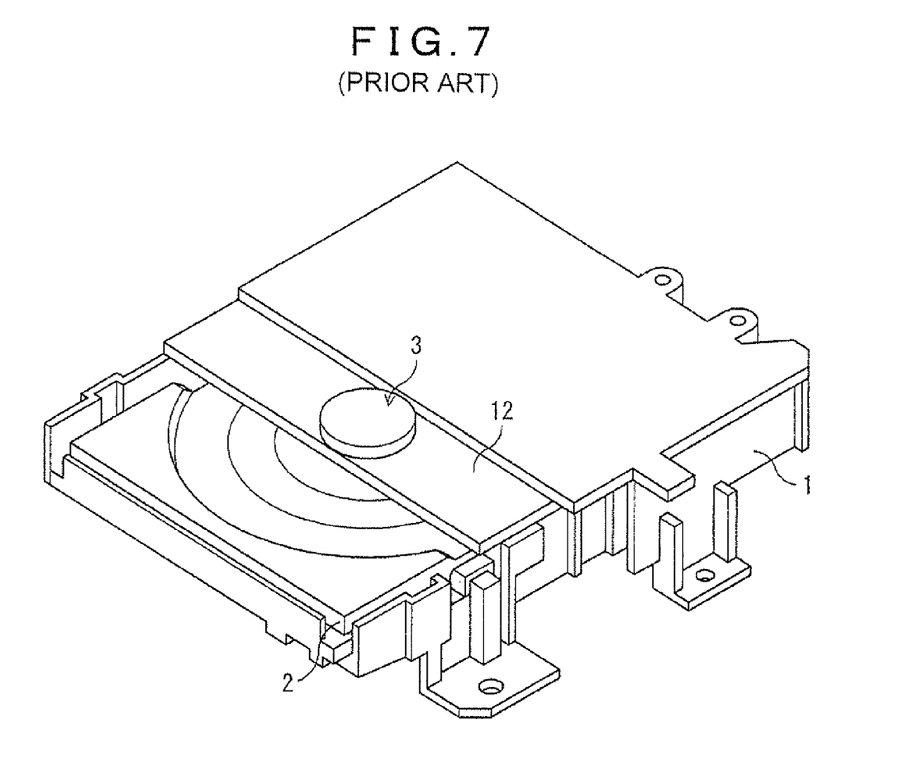
FIG. 7 is an outside view of a disk apparatus.

FIG. 7 is a perspective outside view of a disk apparatus such as a DVD drive for optically processing a disk surface using an optical pickup for recording or reproduction.

In the disk apparatus shown in FIG. 7, a disk tray 2 is assembled ejectable and retractable in a chassis 1 as a fixed member called loader chassis, and a disk can be carried in and out of a set position where the optical pickup not shown in the drawing can perform optical processing by retracting and ejecting the disk tray 2.

Figure 8:
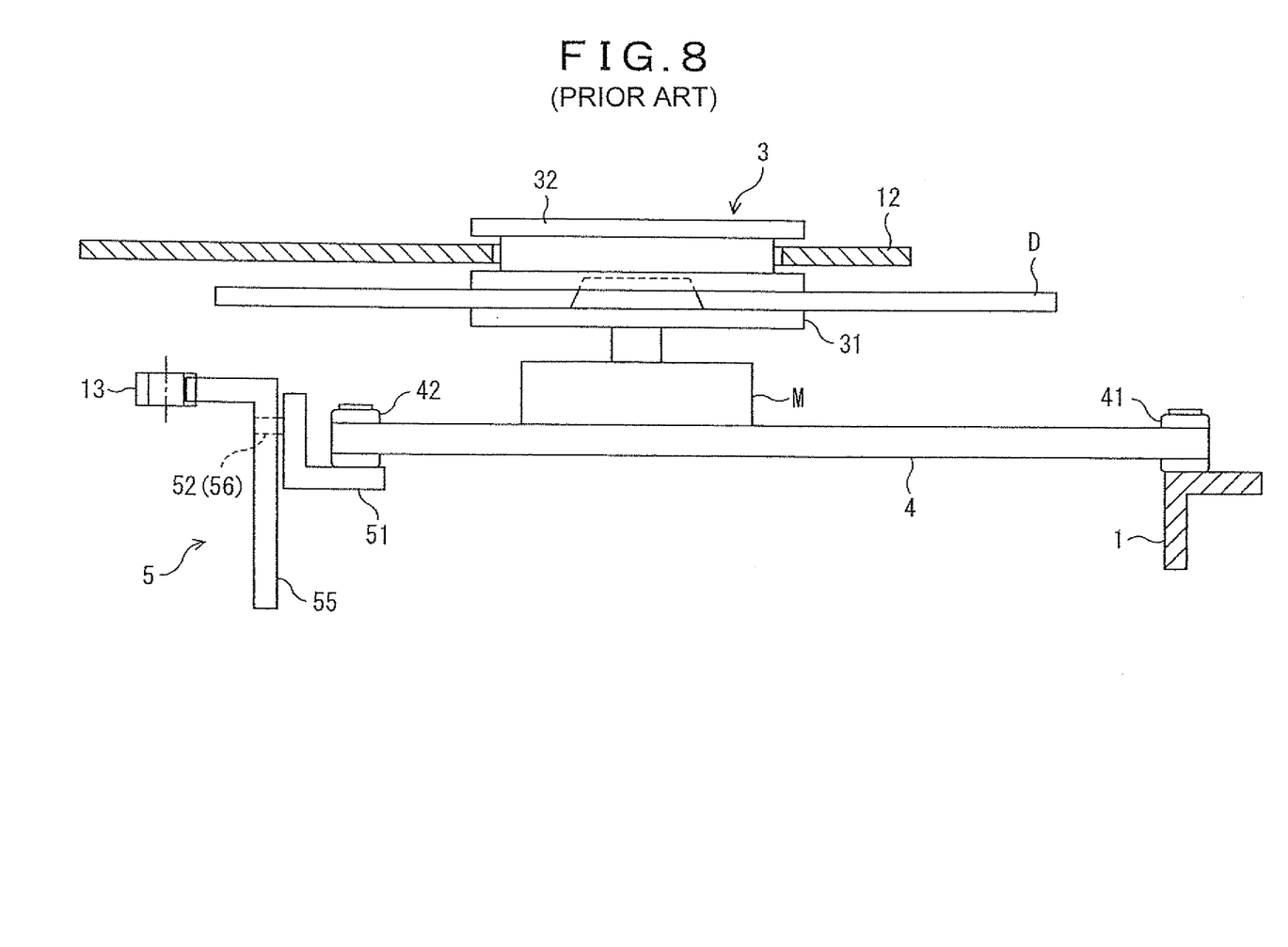
FIG. 8 is a schematic cross-sectional view showing a state where a disk is clamped by a clamp mechanism.
Figure 9:
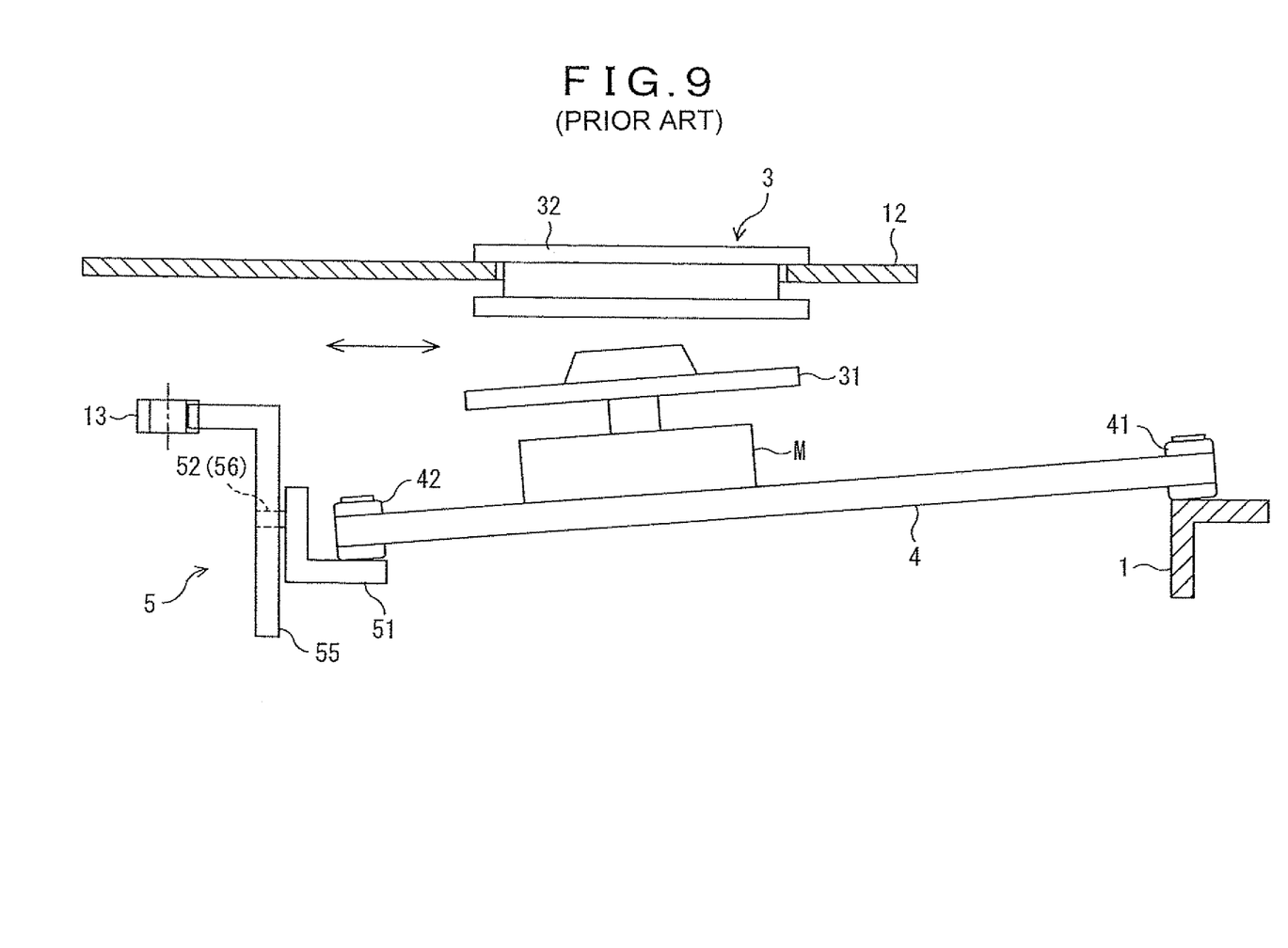
FIG. 9 is a schematic cross-sectional view showing a state where the clamping state by the clamp mechanism is released.

FIG. 8 is a schematic cross-sectional view showing a state where a disk D carried in the set position is clamped by a clamp mechanism 3 that is assembled in the chassis, and FIG. 9 is a schematic cross-sectional view showing a state where the clamping state by the clamp mechanism 3 is released and the disk is carried out of the set position.

The clamp mechanism 3 shown in FIGS. 8 and 9 includes a turntable 31 connected directly to the rotation axis of a motor M and a clamper 32 provided on the beam part 12 of the chassis 1 in such a manner as to face the turntable 31. The motor M is provided on a rectangular frame-shaped movable member 4 on which the optical pickup not shown in the drawings is mounted. Appropriate portions of the movable member 4 such as the both end portions in the width direction at the base end portion (rear end portion) thereof are attached in a cantilever manner to the chassis 1 via elastic bodies 41 as cushion members made of rubber, the movable member 4 being movable vertically between an upper first position and a lower second position around the base end portion. Then, when the movable member 4 is in the first position as shown in FIG. 8, the turntable 31 with the disk D placed thereon comes close to the clamper 32 and the two components 31 and 32 cooperate with each other to hold the disk D therebetween, and further the optical pickup faces the disk surface. The optical processing on the disk surface using the optical pickup is performed by rotating the disk D together with the turntable 31 while the clamp mechanism 3 thus clamps the disk D. On the other hand, when the turntable 31 moves downward together with the optical pickup and the movable member 4 is retracted to the second position as shown in FIG. 9, a clearance for allowing passage of the disk therethrough is formed between the turntable 31 and the clamper 32, and the optical pickup is kept away from the disk surface. The disk can be carried in and out while the movable member 4 is thus moved from the first to second position. Then, if the movable member 4 is retracted from the first to second position, the clamp mechanism 3 performs an unclamping operation. The direction of carrying in and out the disk is indicated by the arrow R in FIG. 9.

A cam mechanism 5 is employed to move the movable member 4 between the first and second positions. The exemplary cam mechanism 5 shown in the drawings includes a shift lever 51 connected to the free end portion of the movable member 4 via elastic bodies 42 as cushion members made of rubber to exhibit a vibration damping effect and a cam main body 55 for allowing the movable member 4 to follow the up-and-down movement of the shift lever 51 and thereby to move between the first and second positions. More specifically, a protrusion 52 on the shift lever 51 is in slidable contact with the cam surface 56 of the cam main body 55. In the exemplary disk apparatus shown in the drawings, the cam main body 55 is constituted by a cam slider movable in the width direction of the chassis 1, and power for driving the cam main body 55 is to be transmitted through a gear 13. The cam surface 56 of the cam main body 55 is tilted so that when the reciprocating cam main body 55 slides in one direction for example, the shift lever 51 moves upward and the movable member 4 follows the upward movement to move from the second to first position, while when the cam main body 55 slides in the other direction, the shift lever 51 moves downward and the movable member 4 follows the downward movement to move from the first to second position.

The elastic bodies 41 and 42 employed in this disk apparatus have only elasticity capable of exhibiting an effect of absorbing vibrations due to the rotation of the motor M and the turntable 31 during optical processing using the optical pickup. Also, the elastic bodies 42, which are provided at the connection between the free end portion of the movable member 4 and the shift lever 51, have only elasticity deformable during the up-and-down movement of the shift lever 51 so that the shift lever 51 can be moved with respect to the free end portion of the movable member 4.

In such a disk apparatus as mentioned above in which the turntable 31 is rotated at about so-called double speed (3000 RPM) during optical processing using the optical pickup, the movable member 4 may employ a resin molded body for weight saving, and it has been known that no vibration causing operational performance problems can occur even if the thus lightened movable member 4 may be used.

However, it has recently been required to take measures so that no vibration causing operational performance problems can occur even if the rotation speed of the turntable 31 may be increased to about quad speed (6000 RPM) to increase the speed of optical processing using the optical pickup. Hence, in order to address such a requirement, the lightened movable member 4 formed of a resin molded body may be provided with a sheet metal weight of several tens of grams to limit vibration.

Meanwhile, there has conventionally been a proposal of installing an additional mass to cancel eccentric loading during disk rotation with focus on the fact that a centrifugal force due to such eccentric loading mainly causes vibration of the apparatus (refer to Japanese Patent Laid-Open Publication No. Hei 11-3582 for example). There has also been a proposal about measures for limiting horizontal vibration of a traverse base in an optical disk apparatus due to disk rotation by bringing a side shoe into contact with the traverse base (refer to Japanese Patent Laid-Open Publication No. 2002-8345 for example).

It has, however, been known that providing the movable member 4 with a weight exhibits an effect of limiting vibration, but at the same time, may lead to a situation where due to the clearance ensured between the protrusion 52 on the shift lever 51 and the cam surface 56 of the cam main body 55 and/or the elasticity of the elastic bodies 42, etc., the weight causes the free end portion of the movable member 4 to be displaced lower than its proper position when the movable member 4 is in the first position, which causes the optical pickup to be displaced from its proper position with respect to the disk D, resulting in a degradation in the accuracy of the optical processing. As for this, the proposals described in Japanese Patent Laid-Open Publication Nos. Hei 11-3582 and 2002-8345 cannot avoid such a situation.

SUMMARY OF THE INVENTION

The present invention has been made under the above-described circumstances, and an object thereof is to provide a disk apparatus in which the optical pickup can be positioned properly and accurately with respect to a disk when the movable member that is attached in a cantilever manner to the chassis is in the first position by taking measures so that the free end portion of the movable member is not displaced lower than its proper position when the movable member is in the first position.

Another object of the present invention is not to reduce the mass productivity of such disk apparatuses by achieving the foregoing object without increasing the number of parts.

A disk apparatus according to the present invention has: a movable member equipped with an optical pickup at a position facing a disk surface and adapted to move around the base end portion thereof between a first position where the optical pickup faces the disk surface and a second position retracted from the first position where the optical pickup is kept away from the disk surface; a chassis as a fixed member to which the base end portion of the movable member is attached; a clamp mechanism adapted to perform a clamping operation for clamping a disk carried in a position facing the optical pickup in conjunction with the movement of the movable member from the second to first position and an unclamping operation for unclamping the disk in conjunction with the movement of the movable member from the first to second position; and a cam mechanism for moving the movable member between the first and second positions, the cam mechanism including a shift lever connected to the free end portion of the movable member via an elastic body exhibiting a vibration damping effect and a cam main body for allowing the movable member to follow the up-and-down movement of the shift lever and thereby to move between the first and second positions, the disk apparatus including: positioning means for positioning the free end portion of the movable member; and anti-positioning means for releasing a positioning state of the movable member by the positioning means.

In accordance with the thus arranged disk apparatus, when the movable member is in the first position, the positioning means prevents sinking of the shift lever so that the free end portion of the movable member is positioned, which prevents the movable member from being displaced from the first to second position and thereby allows the optical pickup to be positioned properly and accurately. This effect can be exhibited similarly even if the movable member may be provided with a weight. In addition, the anti-positioning means releases a positioning state of the movable member by the positioning means before the movement of the movable member from the first to second position, whereby the movable member can be moved from the first to second position with no inconvenience.

In the present invention, the positioning means preferably has a protrusion provided on the shift lever and a stepped engaging surface for supporting the protrusion thereon. This arrangement allows the protrusion to be formed integrally with the shift lever and the engaging surface to be provided on the chassis, having the advantage that there is no need to increase the number of parts and therefore the mass productivity cannot be reduced.

In the present invention, the positioning means preferably further has a guide mechanism for displacing the shift lever to draw the protrusion onto the engaging surface. This arrangement allows the protrusion to run on the engaging surface reliably when the movable member is moved from the second to first position, resulting in an improvement in the stability of the positioning action.

In the present invention, the guide mechanism preferably includes a movable slant surface provided on the shift lever and a fixed slant surface provided on the chassis on which the movable slant surface is slidable. This arrangement has the advantage that there is no need to increase the number of parts to form the guide mechanism and therefore the mass productivity cannot be reduced.

In the present invention, the anti-positioning means may be formed by the cam main body for displacing the shift lever while deforming the elastic body to separate the movable slant surface from the fixed slant surface and for displacing the protrusion to disengage the protrusion from the engaging surface. This arrangement causes the cam main body not only to move the movable member but also to serve as anti-positioning means, having the advantage that there is no need to increase the number of parts to form the anti-positioning means and therefore the mass productivity cannot be reduced.

The disk apparatus according to the present invention is further specified by employing the following arrangements. That is, the disk apparatus has: a movable member equipped with an optical pickup at a position facing a disk surface and adapted to move around the base end portion thereof between a first position where the optical pickup faces the disk surface and a second position retracted from the first position where the optical pickup is kept away from the disk surface; a chassis as a fixed member to which the base end portion of the movable member is attached; a clamp mechanism adapted to perform a clamping operation for clamping a disk carried in a position facing the optical pickup in conjunction with the movement of the movable member from the second to first position and an unclamping operation for unclamping the disk in conjunction with the movement of the movable member from the first to second position; and a cam mechanism for moving the movable member between the first and second positions, the cam mechanism including a shift lever connected to the free end portion of the movable member via an elastic body exhibiting a vibration damping effect and a cam main body for allowing the movable member to follow the up-and-down movement of the shift lever and thereby to move between the first and second positions, the disk apparatus including: a weight attached to the movable member to exhibit a vibration control effect for the movable member; positioning means having: a protrusion provided on the shift lever; a stepped engaging surface for supporting the protrusion thereon to position the free end portion of the movable member; and a guide mechanism for displacing the shift lever to draw the protrusion onto the engaging surface, the guide mechanism including a movable slant surface provided on the shift lever and a fixed slant surface provided on the chassis on which the movable slant surface is slidable; and anti-positioning means formed by the cam main body to release a positioning state of the movable member by the positioning means by displacing the shift lever around the position of the elastic body while deforming the elastic body with the movable member being in the first position to separate the movable slant surface from the fixed slant surface and by displacing the protrusion around the position of the elastic body to disengage the protrusion from the engaging surface. Operations of the present invention will be described in detail with reference to the embodiments below.

As described heretofore, in accordance with the present invention, even if the movable member that is attached in a cantilever manner to the chassis is heavy or light, the free end portion of the movable member cannot be displaced lower than its proper position when the movable member is in the first position, whereby the optical pickup can be positioned properly and accurately with respect to a disk when the movable member is in the first position. This achieves an effect that users can enjoy clear images even if the disk apparatus may operate at quad speed. In addition, the number of parts may not necessarily be increased, with the advantage that the mass productivity of such disk apparatuses cannot be reduced.

DESCRIPTION OF THE PREFERRED EMBODIMENTS

Figure 1:
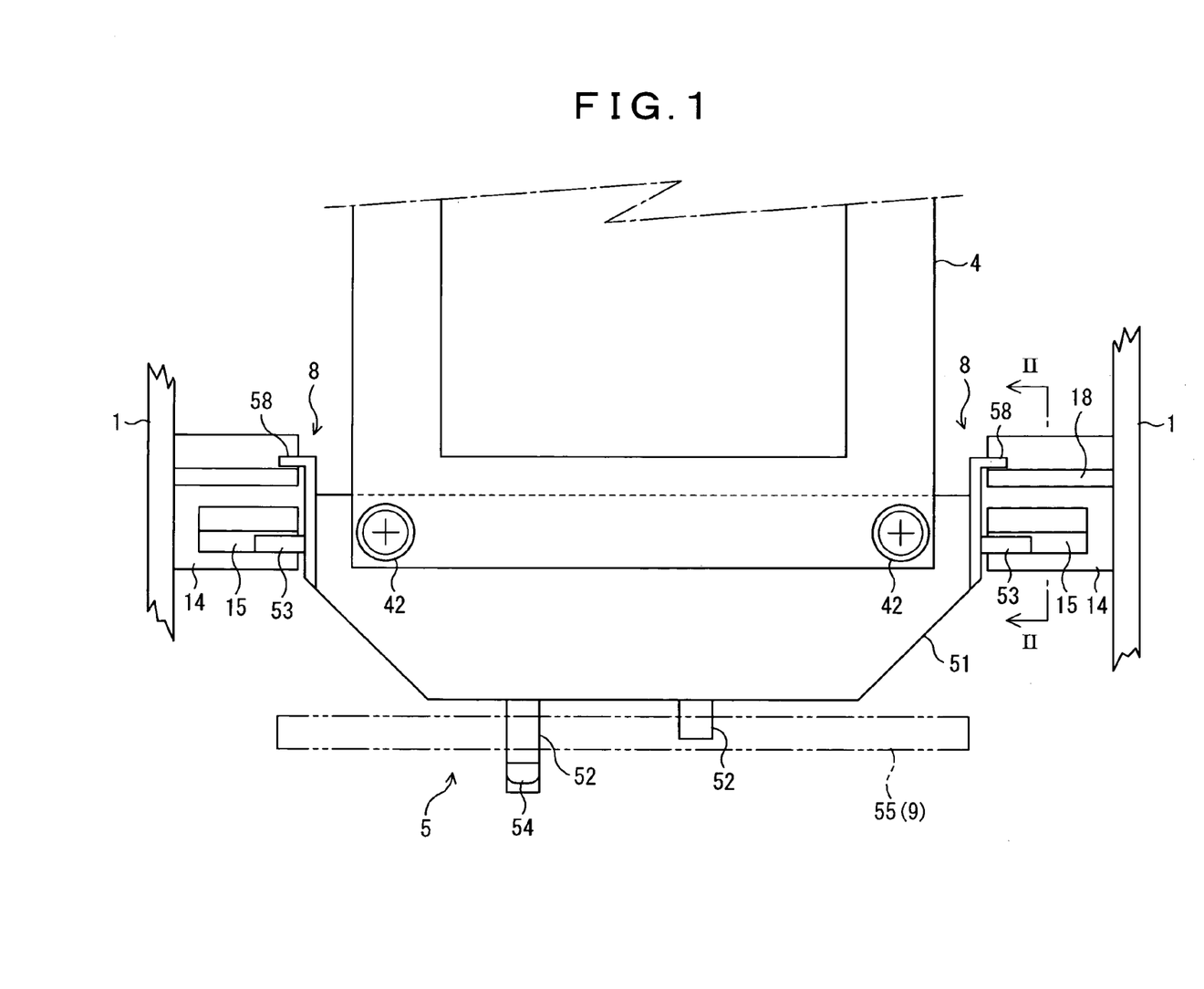
FIG. 1 is a schematic plan view showing a substantial part of a disk apparatus according to an embodiment of the present invention.
Figure 2:
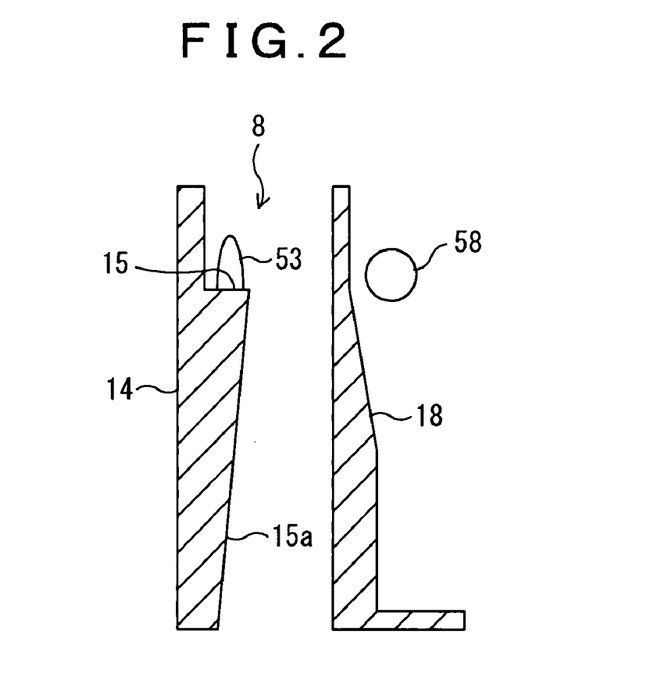
FIG. 2 is a cross-sectional view of the part taken along the line II-II of FIG. 1.
Figure 3:
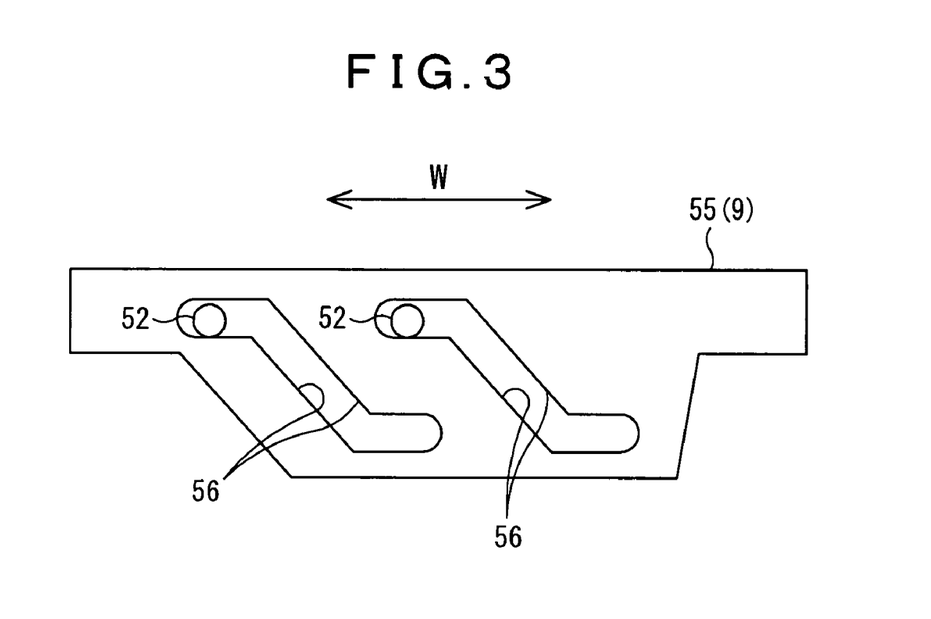
FIG. 3 is an illustrative view showing an example of the shape of a cam main body.
Figure 4A:
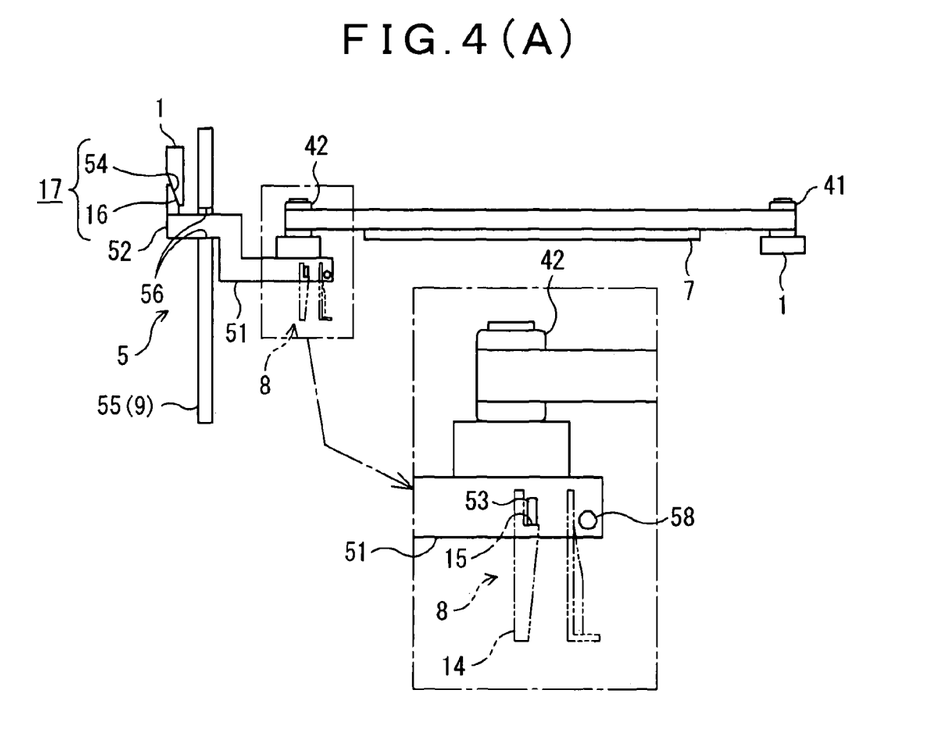
FIG. 4(A) illustrates the operation of a movable member in a first position and FIG. 4(B) illustrates a state of a cam mechanism 5 corresponding to FIG. 4(A)
Figure 4B:
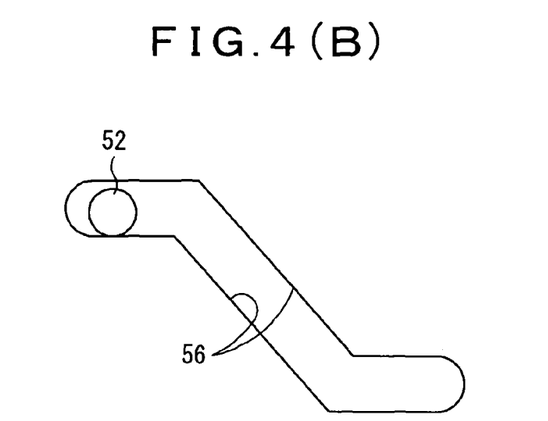
Figure 5A:
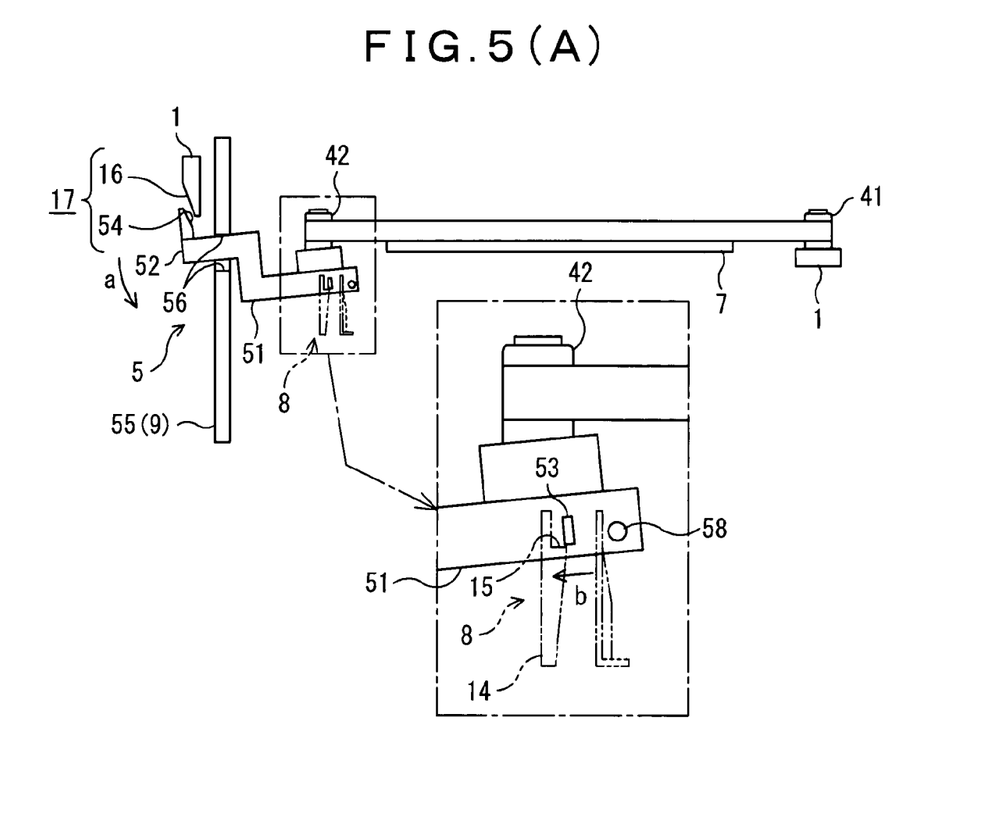
FIG. 5(A) illustrates the operation of anti-positioning means 9 and FIG. 5(B) illustrates a state of the cam mechanism corresponding to FIG. 5(A)
Figure 5B:
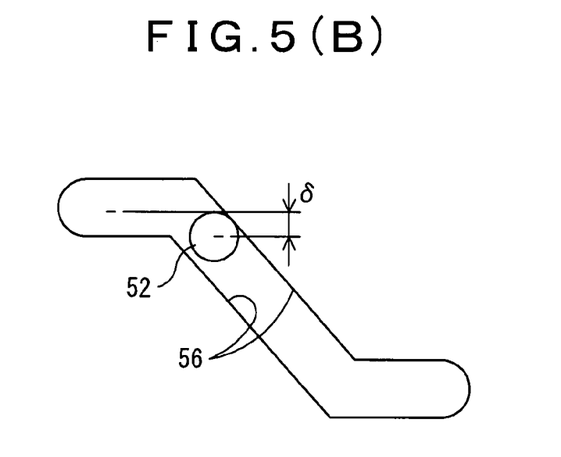
Figure 6A:
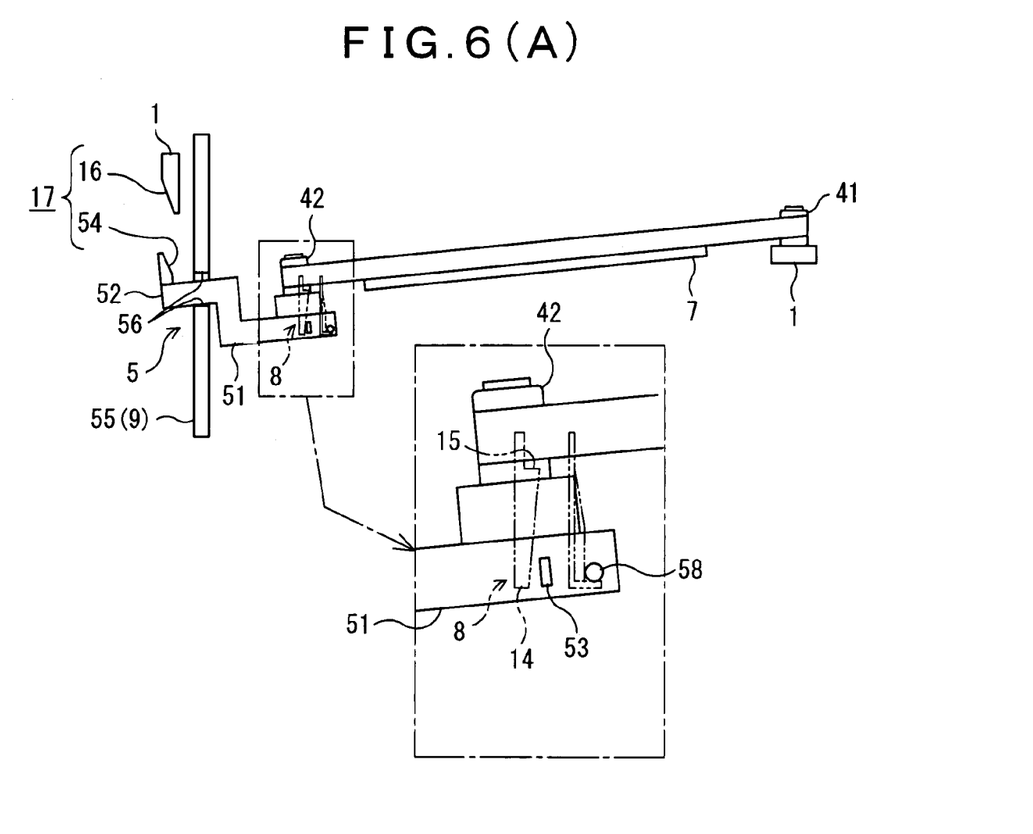
FIG. 6(A) illustrates the operation of the movable member in a second position and FIG. 6(B) illustrates a state of the cam mechanism corresponding to FIG. 6(A)
Figure 6B:
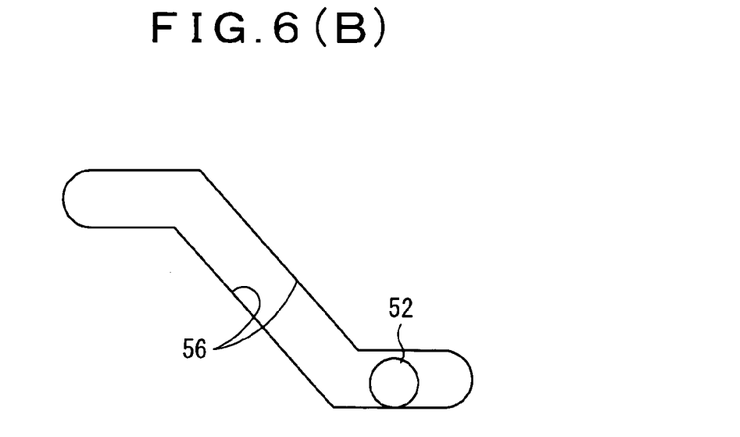

FIG. 1 is a schematic plan view showing a substantial part of a disk apparatus according to an embodiment of the present invention; FIG. 2 is a cross-sectional view of the part taken along the line II-II of FIG. 1; FIG. 3 is an illustrative view showing an example of the shape of a cam main body 55; FIG. 4(A) illustrates the operation of a movable member 4 in a first position and FIG. 4(B) illustrates a state of a cam mechanism 5 corresponding to FIG. 4(A); FIG. 5(A) illustrates the operation of anti-positioning means 9 and FIG. 5(B) illustrates a state of the cam mechanism 5 corresponding to FIG. 5(A); and FIG. 6(A) illustrates the operation of the movable member 4 in a second position and FIG. 6(B) illustrates a state of the cam mechanism 5 corresponding to FIG. 6(A).

In the disk apparatus of FIG. 1, the arrangements that the movable member 4 is equipped with an optical pickup (not shown in the drawing) at a position facing a disk surface and that the movable member 4 is adapted to move around the base end portion thereof between a first position where the optical pickup faces the disk surface and a second position retracted from the first position where the optical pickup is kept away from the disk surface are the same as those described with reference to FIGS. 8 and 9. It is noted that optical processing means optical recording or reproduction onto/from a disk surface through an optical pickup.

The arrangements that the disk apparatus has: a chassis 1 as a fixed member to which the base end portion of the movable member 4 is attached via elastic bodies 41; a clamp mechanism (not shown in the drawing) adapted to perform a clamping operation for clamping a disk carried in a position facing the optical pickup in conjunction with the movement of the movable member 4 from the second to first position and an unclamping operation for unclamping the disk in conjunction with the movement of the movable member 4 from the first to second position; and a cam mechanism 5 for moving the movable member 4 between the first and second positions and that the cam mechanism 5 includes a shift lever 51 connected to the free end portion of the movable member 4 via elastic bodies 42 exhibiting a vibration damping effect and a cam main body 55 for allowing the movable member 4 to follow the up-and-down movement of the shift lever 51 and thereby to move between the first and second positions are also the same as those described with reference to FIGS. 8 and 9. It is noted that in the present embodiment, a sheet metal weight 7 is mounted on the rear surface of the movable member 4 to exhibit a vibration control effect when the turntable rotates at high speed, as shown in FIGS. 4(A), 5(A), and 6(A).

As shown in FIG. 3, the cam main body 55 in the cam mechanism 5 is constituted by a cam slider movable back and forth in the width direction W of the chassis 1 as described with reference to FIGS. 8 and 9 and includes two slant cam surfaces 56. Then, two protrusions 52 and 52 provided on the front end of the shift lever 51 are in slidable contact with the respective cam surfaces 56.

As shown in FIG. 1, positioning means 8 are provided on either side of the shift lever 51. Each positioning means 8 includes a lateral protrusion 53 provided on the shift lever 51 and a vertical groove portion 14 provided in the chassis 1 and fitted with the protrusion 53 therein. The vertical groove portion 14 is formed with a horizontal stepped engaging surface 15 with which the protrusion 53 is engageable and a guide surface 15a extending downward from an end edge of the engaging surface 15. Then, when the movable member 4 is moved from the second to first position, the protrusion 53 slides on the guide surface 15a with the elastic bodies 42 being deformed against the elasticity thereof, and then leaves the upper end of the guide surface 15a so that the elastic bodies 42 restore their initial shapes and the protrusion 53 runs on the engaging surface 15 as shown in FIGS. 1, 2, and 4. When the protrusion 53 thus runs on the engaging surface 15, the protrusion 53 is supported by the engaging surface 15, which prevents downward sinking of the shift lever 51 when the movable member 4 is in the first position so that the free end portion of the movable member 4 is positioned not to be displaced downward by the weight 7. This allows the optical pickup to be positioned properly and accurately even if the movable member 4 is heavy. Accordingly, the positional relationship between the optical pickup on the movable member 4 and a disk can be maintained properly, resulting in an improvement in the accuracy of the optical processing on the disk surface using the optical pickup.

As shown in FIGS. 4(A), 5(A), and 6(A), the present embodiment includes a guide mechanism 17 having a movable slant surface 54 provided on one protrusion 52 on the shift lever 51 and a fixed slant surface 16 provided on the chassis 1 on which the movable slant surface 54 is slidable. The guide mechanism 17 exhibits an effect of displacing the shift lever 51 forward to draw the protrusion 53 onto the engaging surface 15 when the movable member 4 is moved from the second to first position. Therefore, when the movable member 4 is moved from the second to first position, the shift lever 51 is displaced forward reliably through the multiplier effect of the guide mechanism 17 and the elastic bodies 42 thus restoring their initial shapes, which causes the protrusion 53 to be drawn forcibly onto the engaging surface 15 and to run reliably on the engaging surface 15. This allows the optical pickup to be positioned properly and accurately even if the movable member 4 is heavy, as is the case above.

Furthermore, the present embodiment includes anti-positioning means 9 for releasing a positioning state of the movable member 4 by the positioning means 8 before the movable member 4 is moved from the first to second position by the cam main body 55 in the cam mechanism 5. When the cam main body 55 slides and each protrusion 52 on the shift lever 51 comes into contact with the slant portion of each cam surface 56 to be pressed down slightly by a certain amount ☐ from the position shown in FIG. 4(B) (corresponding to the first position of the movable member 4) to the position shown in FIG. 5(B), the anti-positioning means 9 displaces the shift lever 51 around the position of each elastic body 42, as indicated by the arrow "a", while deforming the elastic bodies 42 with the movable member 4 being in the first position, as shown in FIG. 5(A), to separate the movable slant surface 54 from the fixed slant surface 16. The anti-positioning means 9 also displaces the protrusion 53 around the position of each elastic body 42, as indicated by the arrow "b", to disengage the protrusion 53 from the engaging surface 15. Therefore, after the protrusion 53 is disengaged from the engaging surface 15 through the operation of the anti-positioning means 9, the protrusion 53 moves downward through the vertical groove portion 14 with the downward movement of the cam main body 55, and at the same time, the shift lever 51 moves downward together with the movable member 4.

As shown in FIGS. 1 and 2, additional protrusions 58 provided on the shift lever 51 face cam surfaces 18 provided on the chassis 1 in the present embodiment. Then, the protrusions 58 are adapted to be guided by the respective cam surfaces 18 when the movable member 4 is moved between the first and second positions, which arrows the protrusion 53 to move smoothly up and down through the vertical groove portion 14.

What is claimed is:

1. A disk apparatus comprising:
    a movable member equipped with an optical pickup at a position facing a disk surface and adapted to move around the base end portion thereof between a first position where said optical pickup faces said disk surface and a second position retracted from said first position where said optical pickup is kept away from said disk surface;
    a chassis as a fixed member to which the base end portion of said movable member is attached;
    a clamp mechanism adapted to perform a clamping operation for clamping a disk carried in a position facing said optical pickup in conjunction with the movement of said movable member from said second to first position and an unclamping operation for unclamping the disk in conjunction with the movement of said movable member from said first to second position;
    a cam mechanism for moving said movable member between said first and second positions, said cam mechanism including a shift lever connected to the free end portion of said movable member via an elastic body exhibiting a vibration damping effect and a cam main body for allowing said movable member to follow the up-and-down movement of said shift lever and thereby to move between said first and second positions;
    a weight attached to said movable member to exhibit a vibration control effect for said movable member;
    positioning means having: a protrusion provided on said shift lever; a stepped engaging surface for supporting said protrusion thereon to position the free end portion of said movable member; and a guide mechanism for displacing said shift lever to draw said protrusion onto said engaging surface, said guide mechanism including a movable slant surface provided on said shift lever and a fixed slant surface provided on said chassis on which said movable slant surface is slidable; and
    anti-positioning means formed by said cam main body to release a positioning state of said movable member by said positioning means by displacing said shift lever around the position of said elastic body while deforming said elastic body with said movable member being in said first position to separate said movable slant surface from said fixed slant surface and by displacing said protrusion around the position of said elastic body to disengage said protrusion from said engaging surface.

2. A disk apparatus comprising:
    a movable member equipped with an optical pickup at a position facing a disk surface and adapted to move around the base end portion thereof between a first position where said optical pickup faces said disk surface and a second position retracted from said first position where said optical pickup is kept away from said disk surface;
    a chassis as a fixed member to which the base end portion of said movable member is attached;
    a clamp mechanism adapted to perform a clamping operation for clamping a disk carried in a position facing said optical pickup in conjunction with the movement of said movable member from said second to first position and an unclamping operation for unclamping the disk in conjunction with the movement of said movable member from said first to second position;
    a cam mechanism for moving said movable member between said first and second positions, said cam mechanism including a shift lever connected to the free end portion of said movable member via an elastic body exhibiting a vibration damping effect and a cam main body for allowing said movable member to follow the up-and-down movement of said shift lever and thereby to move between said first and second positions;
    positioning means for positioning the free end portion of said movable member, said positioning means having: a protrusion provided on said shift lever, a stepped engaging surface for supporting said protrusion thereon and a guide mechanism for displacing said shift lever to draw said protrusion onto said engaging surface, wherein said guide mechanism includes a movable slant surface provided on said shift lever and a fixed slant surface provided on said chassis on which said movable slant surface is slidable; and
    anti-positioning means for releasing a positioning state of said movable member by said positioning means.

3. The disk apparatus according to claim 2, wherein said anti-positioning means is formed by said cam main body for displacing said shift lever while deforming said elastic body to separate said movable slant surface from said fixed slant surface and for displacing said protrusion to disengage said protrusion from said engaging surface.

* * * * *